T. Atkinson,
Bee Hive.

No. 89,841.  Patented May 11. 1869.

UNITED STATES PATENT OFFICE.

THOMAS ATKINSON, OF MEMPHIS, TENNESSEE.

IMPROVEMENT IN BEE-HIVES.

Specification forming part of Letters Patent No. 89,841, dated May 11, 1869.

Be it known that I, THOMAS ATKINSON, of Memphis, county of Shelby, and State of Tennessee, have invented a new and useful Improvement in Bee-Hives; and I do hereby declare that the following is a full, clear, and exact description of the construction and operation of the same, reference being had to the annexed drawings, making a part of this specification, in which—

Figure 1:
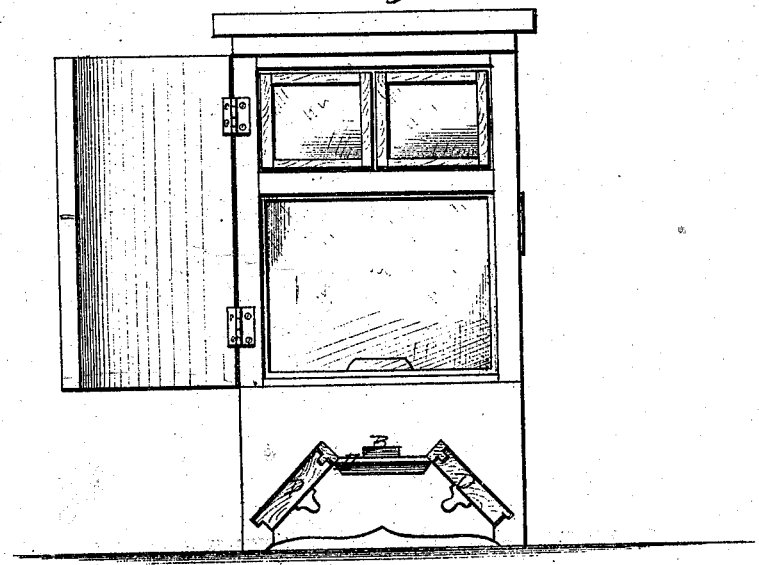
Figure 3:
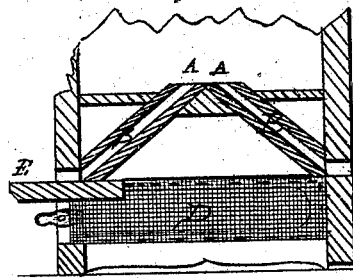
Figure 2:
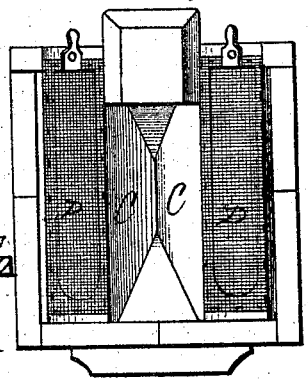

Figure 1 is a front elevation; Fig. 2, view of bottom hive inverted; Fig. 3, a sectional elevation of the bottom in proper position.

The bottom is made with sloping sides provided with sliding wire ventilators. The entrances for the bees are through two inclined tubes opening at the center and some distance above the apex of the sides.

C, bottom board of hive; D D, ventilators; A A, terminus of entrances; B, entrance; E, lighting-board.

I construct my hive in a square or oblong square, to which I attach a bottom, C, made in a ∧-shape, to which I attach one or more inclosed entrances terminating near the center of the hive.

To the bottom C, I have attached two ventilators, made to slide in grooves for the purpose of removing them, when desired, for hiving the bees or other purposes, as shown in D D.

The object of my invention is to provide bee-hives with a sloping entrance, B, terminating near the center of the hive at A A, in combination with the ∧-shaped bottom provided with sliding ventilators, in this manner giving the bees a better chance to guard the hive against moths or insects, while the sloping bottom C allows the bees easily to remove any filth or dead bees from the hive.

What I claim as my invention, and wish to secure by Letters Patent, is—

The entrance formed of the sloping incased tubes B B, in combination with the inclined bottom A A, when provided with the sliding ventilators, as set forth.

THOMAS ATKINSON.

Witnesses:
   JNO. E. FINLEY,
   S. G. DODGE.